(12) United States Patent
Dicker

(10) Patent No.: US 8,606,721 B1
(45) Date of Patent: Dec. 10, 2013

(54) IMPLICIT SOCIAL GRAPH EDGE STRENGTHS

(75) Inventor: Russell A. Dicker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 273 days.

(21) Appl. No.: 12/046,403

(22) Filed: Mar. 11, 2008

(51) Int. Cl.
*G06Q 10/00* (2012.01)

(52) U.S. Cl.
USPC .......................................................... 705/319

(58) Field of Classification Search
USPC ............................................... 705/1, 319, 1.1
See application file for complete search history.

(56) References Cited

U.S. PATENT DOCUMENTS

| | | | |
|---|---|---|---|
| 2002/0062368 A1* | 5/2002 | Holtzman et al. | 709/224 |
| 2004/0122803 A1* | 6/2004 | Dom et al. | 707/3 |
| 2005/0171955 A1* | 8/2005 | Hull et al. | 707/10 |
| 2006/0080613 A1* | 4/2006 | Savant | 715/745 |
| 2006/0200435 A1* | 9/2006 | Flinn et al. | 706/12 |
| 2007/0214097 A1* | 9/2007 | Parsons et al. | 706/12 |
| 2008/0040475 A1* | 2/2008 | Bosworth et al. | 709/224 |
| 2008/0040673 A1* | 2/2008 | Zuckerberg et al. | 715/745 |
| 2008/0109245 A1* | 5/2008 | Gupta | 705/1 |
| 2008/0120308 A1* | 5/2008 | Martinez et al. | 707/100 |
| 2009/0164334 A1* | 6/2009 | Schmidt et al. | 705/26 |
| 2009/0165022 A1* | 6/2009 | Madsen et al. | 719/318 |

OTHER PUBLICATIONS

"SEND.COM Redefines Gift Giving Online". PR Newswire, New York, Nov. 8, 1999.*
Camerer, Colin. "Gifts as Economic Signals and Social Symbols". The American Journel of Sociology, vol. 94 Supplement: Organizations and Institutions: Sociological and Economic Approaches to the Analysis of Social Structure (1988), 5180-S214.*

* cited by examiner

*Primary Examiner* — Gabrielle McCormick
(74) *Attorney, Agent, or Firm* — Lee & Hayes, PLLC

(57) ABSTRACT

Techniques for calculating edge strengths for edges of a social graph are described herein. These techniques may determine an affinity between a first user of a social graph and a second user of the social graph. Based at least in part on this affinity, a strength of an edge connecting the first user and the second user on the social graph may be calculated and assigned to the corresponding edge.

31 Claims, 6 Drawing Sheets

IMPLICIT SOCIAL GRAPH EDGE STRENGTHS

BACKGROUND

A social graph is a social structure comprising nodes that connect together via edges or ties to show some sort of interdependency or relationship between the nodes. For instance, the nodes may represent people, organizations, or other sorts of entities. The edges between the nodes may represent interdependency or a relationship between the nodes, such as friends, co-workers, values, visions, dislikes, and/or the like. In one context, nodes of a social graph represent users of a social networking site. The edges, meanwhile, connect those users that have chosen to be within one another's network (i.e., connects users that are "friends").

In some instances, the larger a social graph becomes, the more useful the social graph becomes to users. As the users of the social graph become increasingly reliant on the graph, the graph may likewise become more valuable to the owner or possessor of the graph (e.g., the social networking site). It is possible, however, for a social graph to continue to grow to a point where the number of users and edge connections dilute the value of the graph itself. Here, the sheer breadth of the social graph makes it difficult for the graph owner or another entity to fully understand the relationships between the users of the social graph.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 3 illustrates another example architecture that includes the edge strength calculation service of FIGS. 1-2. Here, the service may calculate different dimensional edge strengths, such as personal edge strengths, professional edge strengths, and the like.

DETAILED DESCRIPTION

Figure 1:
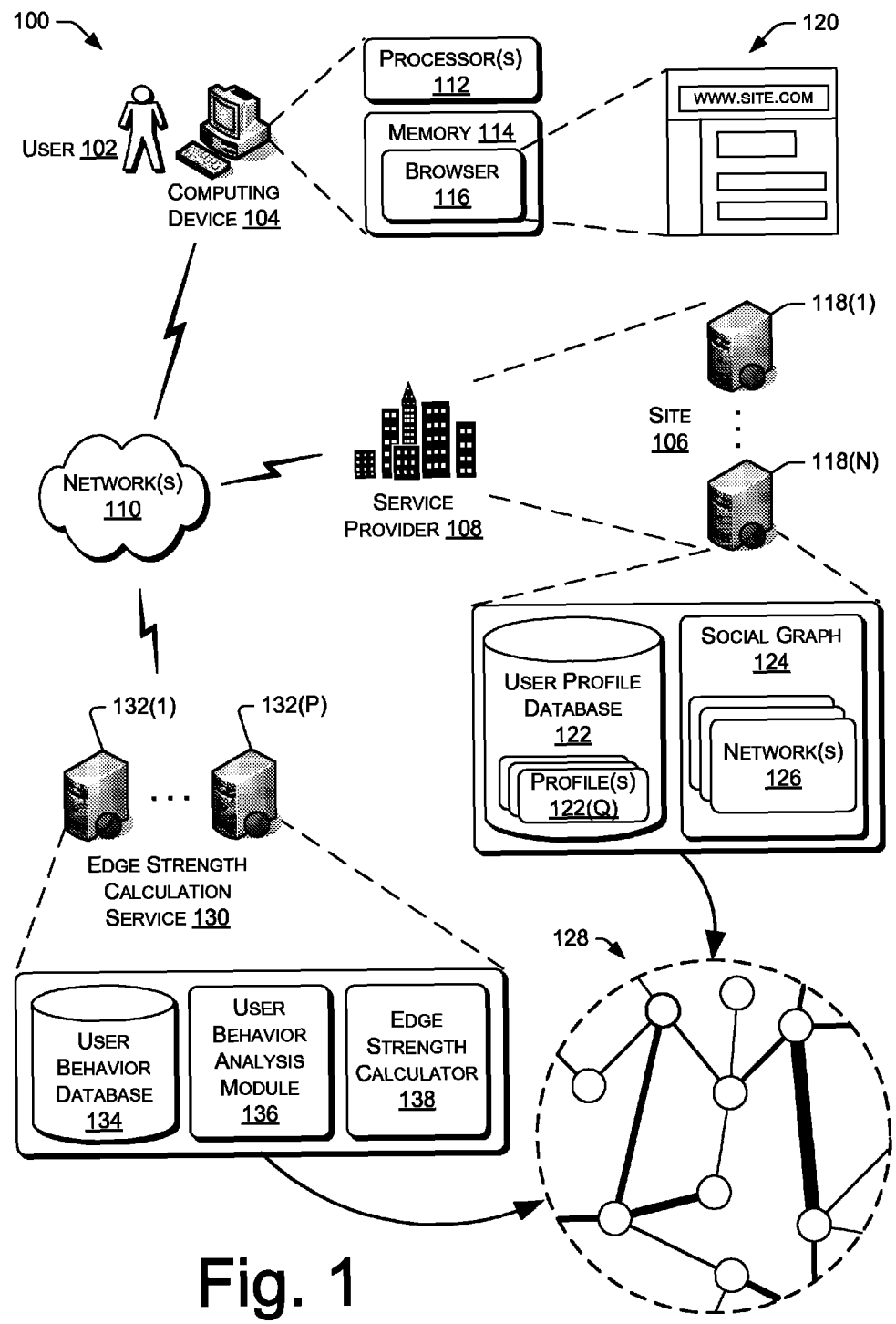
FIG. 1 illustrates an example architecture for calculating strengths of edges connecting nodes in a social graph. This example illustrates a user operating a computing device to access a site of a service provider that employs the social graph. The service provider may leverage an edge strength classification service to determine varying edge strengths corresponding to edges of the social graph.

This disclosure is directed to, among others, calculating edge strengths for edges of a social graph. As discussed above, a social graph may be a powerful tool for both users of the graph as well as the owner or possessor of the graph. However, traditional social graphs often treat each edge connection as homogenous. For instance, if a social networking site employs a social graph, each member of a network of a particular user (e.g., each "friend", "colleague" or other connection of the particular user) may be viewed as having an equally strong relationship with the particular user. When the particular user acquires many friends or members of the network, however, it may become difficult to differentiate between those network members that are truly strongly connected and those network members that are less strongly connected. As such, the social graph may become so large that the value of the graph actually decreases due to this inability to differentiate amongst the many relationships.

The described techniques therefore calculate edge strengths for some or all edges of a social graph in order to differentiate between the many edges of the social graph. The calculated edge strengths may therefore help to better understand relationships within the social graph when compared to traditional homogeneous social graphs. As discussed above, the nodes of social graphs may represent people, organizations, or other sorts of entities. The edges between the nodes, meanwhile, may represent interdependency or a relationship between the nodes, such as friends, co-workers, values, visions, dislikes, and/or the like.

In one context, nodes of a social graph represent users of a social networking site. Here, an edge strength may be calculated for each edge that connects a particular user to another user (e.g., each "friend" of the particular user). Relatively high edge strengths may accordingly indicate a relatively high importance of the corresponding user when compared to users corresponding to relatively low edge strengths. In addition to indicating relative user importance, edge scores may similarly indicate multiple other aspects of other types of social graphs (e.g., similarities, dissimilarities, etc.). Furthermore, these techniques may calculate strengths between users of the social graph that are not connected (or have yet to be connected) via edges.

In some embodiments, the described techniques analyze implicit data in order to calculate edge strengths. For instance, user activity and/or behavior may be analyzed in order to determine an affinity between users. In turn, this determined affinity may be used in whole or in part to calculate and assign an edge strength to an edge that connects the two users. The described techniques may analyze multiple different types of user activity to determine the affinity. In some instances, the affinity may be determined by weighting the activity (e.g., according to type, frequency, etc.) and summing the weighted activities.

Once edge strengths have been calculated and assigned, the owner of the social graph or another entity may leverage this data in multiple ways. For instance, an entity could leverage this data for use in advertising, suggesting gifts, expanding or contracting a user's network, categorizing and/or displaying relationships in a user's network, or in any other way. While a few uses of the described techniques have been discussed, it is to be appreciated that numerous other entities may leverage these techniques in numerous other ways.

The described techniques for calculating edge strengths for edges of a social graph may be implemented in a number of ways and in a number of contexts. One example implementation and context is provided with reference to the following figures, as described below in more detail. It is to be appreciated, however, that the following implementation and context is but one of many.

Example Environment and System Architecture

FIG. 1 illustrates an example architecture 100 in which calculating edge strengths for edges of a social graph may be implemented. Here, the techniques are described in the context of a site, such as a social networking or another type of site that employs or otherwise leverages a social graph. It is to be appreciated, however, that the calculating and/or assigning techniques may be implemented in a vast number of other environments.

In architecture 100, a representative user 102 employs a user computing device 104 to access a representative content site 106 associated with a service provider 108. Content site 106 may comprise any sort of site that supports user interaction, including social networking sites, e-commerce sites, informational sites, news and entertainment sites, and so forth. Additionally, the site is representative of proprietary sites that receive requests and provide content over proprietary networks other than the Internet and public web. In addition or in lieu of site 106, other embodiments may employ any other type of entity that may employ or leverage a social graph.

While the illustrated example represents user 102 accessing content site 106 of service provider 108, the described techniques may equally apply in instances where user 102 interacts with service provider 108 over the phone, via a kiosk, or in any other manner. It is also noted that the described techniques may apply in other client/server arrangements, as well as in non-client/server arrangements (e.g., locally-stored software applications, set-top boxes, etc.).

Here, user 102 accesses content site 106 via a network 110. Network 110 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a cell phone, a set-top box, a game console, a personal media player (PMP), and so forth. User computing device 104 is equipped with one or more processors 112 and memory 114 to store applications and data. An application, such as browser 116 or other client application, running on device 104 facilitates access to site 106 over network 110.

Site 106 is hosted on one or more servers 118(1), . . . , 118(N) having processing and storage capabilities. In one implementation, the servers might be arranged in a cluster or as a server farm, although other server architectures may also be used to host the site. The site is capable of handling requests from many users and serving, in response, various pages of content that can be rendered at user computing device 104 for viewing by user 102. For instance and as illustrated, site 106 may serve a page 120 to computing device 104. Page 120 may comprise any sort of content, such as a user profile, a search page, a discussion forum, or any other type of page.

In some instances, site 106 may comprise a social networking site. Here, servers 118(1)-(N) may store or otherwise have access to a user profile database 122 and a social graph 124. User profile database 122 may store or otherwise have access to one or more user profiles 122(1), . . . , (Q). Each of user profiles 122(1)-(Q) may correspond to a user of social networking site 106 (e.g., user 102 and so forth) and may contain information about the corresponding user. In some instances where site 106 comprises a social networking site, each of user profiles 122(1)-(Q) may be used to create and serve a profile page for each corresponding user. For instance, page 120 may comprise a profile page for user 102 or for another user of site 106.

As illustrated, site 106 may also employ social graph 124. As discussed above, social graph 124 may comprise multiple nodes that connect to one another via edges or ties. These nodes may represent individuals (e.g., user 102), organizations, another entity, or a combination thereof. In the illustrated example, the nodes of social graph 124 each represent a user of site 106.

Also as illustrated, social graph 124 may comprise one or more networks 126. Here, each of networks 126 represents a network associated with a user of site 106. A network for a particular user, such as user 102, may comprise a subset (i.e., zero or more) of the users of site 106. This subset may comprise, for instance, a collection of users that, together with user 102, have chosen to be a part of the user's community. In some instances, inclusion of a particular user into another user's network is symmetrical. That is, if a first user (e.g., user 102) includes a second user in the first user's network upon the second user's request, then the second user also includes the first user (user 102) in the second user's network. When visually represented, an edge therefore connects a node representing the first user with a node representing the second user. Note, however, that in other instances each user may choose to add or remove users from a corresponding network in an asymmetrical manner.

When taken together, the combination of networks 126 may make up the entirety of social graph 124. FIG. 1 illustrates a portion 128 of social graph 124. As illustrated, portion 128 includes multiple nodes and multiple edges connecting some of the illustrated nodes. Again, in the current example the nodes represent users of site 106. Of course, it is to be appreciated that the nodes may represent users, organizations, and/or other entities in other implementations.

As discussed above, traditional social graphs may represent each edge connecting two nodes as homogeneous. That is, a traditional social graph may treat each edge the same, regardless of whether the affinity between the two represented users is extremely strong or extremely weak. As such, entities that employ these traditional social graphs may view each relationship within the social graph as equal when, in reality, the relationships may in fact differ radically.

To better understand these differing relationships within social graph 124, architecture 100 includes an edge strength calculation service 130. Edge strength calculation service 130 may function to analyze data to determine strengths of edges in social graph 124. For instance, service 130 may determine these edge strengths for one or more of networks 126 or for all or substantially all (e.g., 75%, 90%, etc.) of social graph 124. Service 130 may analyze implicit data (e.g., user behavior or activity), explicit data (e.g., data stored in profiles 122(1)-(Q)), or a combination thereof. In some instances, these determined edge strengths are based on an affinity between users associated with the nodes.

As portion 128 illustrates, the edge strengths calculated by service 130 may combine with social graph 124 to define a social graph that includes edges of varying strengths. Here, portion 128 illustrates the varying strengths via line thickness. That is, a relatively thick line represents a relationship that is relatively stronger or more important that a relatively thinner line. Of course, it is to be appreciated that edge strengths may be illustrated in many other ways, including via numerical associations, percentages, hatching, or in any other manner.

Furthermore, edge strength calculation service 130 may calculate symmetrical edge strengths, directional edge strengths, or a combination thereof. For instance, service 130 may calculate a symmetrical edge strength (an "overall strength") that represents an edge's strength both from the first node to the second node and from the second node to the first node. This symmetrical edge strength may measure an overall affinity between the relationship of the corresponding users. Conversely, service 130 may calculate a directional edge strength, such as a strength from the first node to a second node or a strength from the second node to the first node. This directional strength may represent an affinity of a first user associated with the first node to a second user associated with the second node (or vice versa).

FIG. 1 illustrates that edge strength calculation service 130 may include or have access to one or more servers 132(1), . . . , 132(P) having processing and storage capabilities. While FIG. 1 illustrates service 130 and its servers 132 (1)-(P) as a single entity, it is to be appreciated that the described functionality of service 130 may be spread amongst multiple entities (e.g., service provider 108, a dedicated web service, etc.) and/or across multiple networks. In some architectures, for instance, service provider 108 may itself calculate edge strengths of social graph 124. In other architectures, such as illustrated architecture 100, provider 108 may utilize an external service, such as illustrated edge strength calculation service 130. In some instances, service 130 may employ an Application Programming Interface (API) that allows site 106 to make calls into to the service to determine the calculated edge strengths and/or the determined affinities. Furthermore, service 130 may aggregate user activity from multiple sites in addition to site 106 in order to calculate affinities and strengths of edges. Here, each of these multiple sites (including site 106) may call into the API to share and receive user activity information, affinity information, edge strength information, and the like.

As illustrated, edge strength calculation service 130 includes or has access to a user behavior database 134, a user behavior analysis module 136, and an edge strength calculator 138. User behavior database 134 stores or has access to behavior of users who are associated with site 106. User behavior database 134 may receive this data from site 106, from one or more other entities, may track the data itself, or may acquire this data based on a combination thereof. The stored behavior may comprise activity on site 106, activity apart from site 106, as well as any other type of user behavior.

In the current example where site 106 comprises a social networking site, the stored behavior may include user activity on the site. This activity may include, for instance, user 102 sending messages to or receiving messages from other users of site 106, leaving notes for or receiving notes from other users of site 106, selecting items in a news feed of other users (or having users select items a news feed associated with user 102), buying gifts for or receiving gifts from other users, and/or writing an endorsement for or receiving an endorsement from another user. This activity may also include sending and/or receiving invitations for events using functionality of site 106. In addition to allowing users to send invitations, site 106 may also track acceptances and declinations of the invitations. By doing, site 106 (or another entity that tracks this information) may determine information about the events, such as the size of the events, the context of the event, who is schedule to attend the events, and the like.

Note that in some instances, a "news feed" may represent a portion of a user profile page that includes information about certain users' recent activity (e.g., users in the network or user 102), which may be automatically updated. Additionally or alternatively, the activity stored within database 134 may include setting up appointments that include other users of site 106, being marked as being in a picture (stored on or accessible by site 106) with other users, or attending an event with other users of site 106.

The behavior stored in database 134 may also comprise behavior or activity that is not associated with site 106. This may include, for instance, determining who reads an online article authored by user 102 (or whose articles user 102 reads), determining who user 102 makes calls to or receives calls from on a mobile phone, determining who user 102 travels with, or determining groups that user 102 is a part of.

Additionally, this behavior or activity stored in database 134 may be, for example, gathered from online gaming activities, which may allow users to play games or otherwise interact with one another over one or more networks. For instance, the identity of the users interacting with one another may be logged and stored in database 134. Other information may include a frequency of play with the users, identities of users that engage in chats with one another (e.g., via a voice or text chat), identities of users who send and/or receive invitations to play or interact over the network, identities of users who send and/or receive invitations to join a network of friends, or the like. These gaming services, an application on a user's gaming console, or any other entity may then provide this information to edge strength calculation service 130.

In still other instances, database 134 may store or otherwise have access to information about identities of users who communicate with one another outside of site 106 in other ways. For instance, database 134 may receive information (e.g., caller ID information) about who user 102 has spoken to over the phone, a frequency with which user 102 speaks to such people, a length of these conversations, and the like. Similarly, database 134 may receive corresponding information for short message service (SMS) communications or any other type of communications within or outside of site 106. For both voice and textual communications over a user's phone, the user's phone may include, in some implementations, an application that monitors this information. The application may then communicate this information over a network to a web service, such as edge strength calculation service 130.

Additionally, communications via email may also be monitored for use in determining affinities between users. Here, a user's email client may include a plug-in or other type of application that monitors who the corresponding user sends and/or receives email from, as well as the frequency of such emails. For instance, envision that user 102 sends and receives frequent emails from a first user, while sending and receiving much fewer emails from a second user. When provided to edge strength calculation service 130, this information may tend to show that user 102 and the first user have a relatively greater affinity with one another than user 102 and the second user.

In addition to analyzing the frequency of emails, the email client plugin may analyze other characteristics of the email communications. For instance, this plugin (or other application) may determine a frequency with which users appear in a main line of an email (the "To:" line"), a carbon copy line ("cc line"), and/or the blind carbon copy line ("bcc line"). Again, service 130 may deduce that users who are merely cc'ed on an email may be less close to the sending user than is a user who appears in the main address line. In other contexts, the opposite may be true.

Furthermore, the email client plugin (or a plugin associated with a user's calendaring application) may analyze a user's appointments. For instance, the plugin may determine the identity of users who attend meetings or events with the user, as well as a frequency with which these users do so. Additionally, other heuristics of the meetings (such as a group size, meeting context, and the like) may be analyzed to help determine affinities between users. Again, the plugin may communicate this information to service 130 for use in determining affinities and calculating edge strengths.

As described below, this behavior and/or activity may be used to calculate an affinity between users represented on social graph 124. As such, while multiple illustrative examples have been listed, it is to be appreciated that user behavior database 134 may similarly track any other sort of behavior and/or activity that may be useful in determining or estimating affinity between users or other entities.

Next, user behavior analysis module 136 receives and analyzes the stored user behavior to determine affinities between users associated with nodes in social graph 124. For instance, imagine that a network associated with a first user of site 106 includes three other users, each represented by a corresponding node in social graph 124. As such, each of the nodes of these three other users may connect to the node associated with the first user via a corresponding edge. User behavior analysis module 136 may analyze user behavior stored in user behavior database 134 to determine an affinity between the first user and each of the other three users. Module 136 may determine a symmetrical affinity and/or may determine directional affinities.

To determine these affinities, module 136 may weight each type of activity stored within database 134. These weighted activities may then be summed to determine one or more affinities (e.g., symmetrical affinities and/or directional affinities) between each connected node with social graph 124. For instance, buying a gift for another user may be assigned a relatively high weight (representing a relatively high affinity for the other user), while selecting an item in a "news feed" may be assigned a relatively low weight.

Additionally, different values of activities within a same type of activity may be assigned different weights. For instance, buying another user of site 106 a $600 gift may be weighted more heavily that buying another user a $5 gift. Similarly, attending an event with relatively few people may be weighted more heavily than attending an event with a greater number of people. Here, it may be more likely that a smaller, more intimate group of people share a greater affinity with one another than does each person in a larger group of people. In other contexts, the opposite may be true.

Other group heuristics may also be leveraged in weighting users' memberships in groups. For instance, being a member of a smaller group may be weighted more heavily than being a member of a larger group. These weights may also vary based on other heuristics, such as a type of group or a level of activity of the group. For instance, if user 102 is a software engineer, then the user's membership in a square dancing group may be weighted more heavily than the user's membership in a software-development group. Again, in some instances the converse may be true.

In addition to weighting user activity, symmetrical activity may serve as an affinity multiplier in some instances. For instance, if user 102 and another user each consistently send messages to one another via site 106, then this consistent symmetrical activity may serve to significantly increase the determined affinity. This increase may liner, polynomial, exponential, or the like.

While symmetrical activity may act to significantly increase a determined affinity between users, a converse affect may also occur for lack of activity or lack of reciprocation. For instance, if user 102 frequently sends messages to another user of site 106, but the other user seldom or never sends messages back to user 102, then the lack of reciprocation may penalize the overall affinity between the two users. Conversely, a directional affinity from user 102 (the user sending messages) to the other user (the user receiving but not sending messages) may not be adversely affected in some instances. Here, module 136 may still determine that the receiving user is still relatively important to user 102, even if the converse is not true. Decreases in overall affinity between two users may also occur in response to a user blocking a message or note, declining attendance at a party in response to receiving an invitation, seldom reading of another user's news feed, or in response any other activity representative of a lack of reciprocation or interest in the relationship.

With use of these determined affinities, edge strength calculator 138 functions to calculate and assign an edge strength to each edge connecting the node associated with the first user with each node associated with the other three users. The calculated strengths may therefore represent, in whole or in part, corresponding affinities between corresponding users of social graph 124. Therefore, in some instances a relatively high edge strength indicates a relatively high affinity when compared with a relatively low edge strength. For instance, a strength of an edge connecting user 102 and a user for whom user 102 recently purchased a $600 gift for may be relatively high. Conversely, a strength of edge connecting user 102 with another user for whom user 102 recently purchased a $5 gift may be relatively low in comparison.

In some instances, edge strength calculation service 130 periodically, randomly, or continuously determines affinities and, based on the determined affinities, calculates and assigns edge strengths to some or all edges of social graph 124. Additionally, these calculated edge strengths may decay with time in order to ensure that previously strong but now discontinued or less strong relationships do not continue to demonstrate misleading high edge strengths.

Furthermore, and as discussed above, edge strength calculation service 130 may communicate with site 106 as well as one or more other sites to determine affinities and calculate edge strengths. Each of these sites may provide implicit data (e.g., user activity information) and may employ the determined affinities and/or calculated edge strengths. In some instances, some of the sites that provide information to service 130 may employ differing types of social graphs, such as personal social graphs, professional social graphs, and the like. For instance, site 106 may comprise more of a social site than another site, which may be more of a working-related site and, hence, may employ a working-related or professional social graph.

In these instances, edge strength calculation service 130 may determine differing types of affinities based on the differing relationships. With this information, service 130 may then calculate differing edge strengths. To illustrate, return to the example where site 106 comprises a personal social networking site and another site comprises a working-related or professional social networking site. Here, service 130 may employ the data provided by site 106 to calculate a personal affinity between users. Service 130 may then employ the data provided by the professional site to determine a professional affinity between these same (and/or different) users. With these affinities, service 130 may then calculate personal edge strengths between users and professional edge strengths between users. It is specifically noted that while a few illustrative dimensions of relationship have been discussed (e.g., personal and professional), the described techniques may similarly measure any other dimension of relationship between entities.

In addition or in the alternative to measuring these different dimensions of relationships (e.g. personal, professional, etc.) with reference to different sites, edge strength calculation service 130 may measure these different dimensions with reference to different types of activities. For instance, if user 102 employs site 106 to invite other users of site 106 to attend a birthday party, then service 130 may determine that this gathering is a social gathering. Service 130 may then use these activity to determine a personal or social affinity and, hence, to calculate a personal edge strength. Conversely, if user 102 employs site 106 to invite other users of site 106 to attend a work-related meeting, then service 130 may determine that this gathering is a professional gathering. Service 130 may then use this activity to determine a work-related or professional affinity and, hence, to calculate a work-related or professional edge strength.

In another example, a user's email client may include a plugin that monitors a user's email activities and characteristics, as discussed above. For example, the plugin (or other application) may monitor a type of email address that is used when a first user (e.g., user 102) sends an email to a second user. The types of email addresses may include a work address, a personal address, a school address, or any other type of address. For instance, if user 102 often sends emails to a personal email address of the second user, then service 130 may deduce that these emails indicate a personal affinity between user 102 and the second user. If, however, user 102 instead often sent emails to a work email address of the second user, then service 130 may deduce that these emails indicate a professional affinity between user 102 and the second user. Other heuristics of these emails or other communications may be similarly tracked and leveraged.

Once edge strength calculator 138 calculates edge strengths based in whole or in part upon the determined affinities, service 130 may provide these strengths to site 106 and/or to one or more other sites or entities. Site 106 and/or the other entities may then employ or leverage this information in multiple ways.

For instance, site 106 may personalize data provided to users of site 106 based in part or in whole on the received edge strengths. For instance, site 106 may determine the most important users to user 102 (e.g., the five users in the network of user 102 having the highest symmetrical and/or directional edge strengths) and may apprise user 102 of recent activity of these five most important users. That is, site 106 may personalize a news feed associated with user 102 based on strengths of edges between user 102 and members of the user's network. This personalization may entail frequently populating this news feed with information about the top five users, while less frequently or never populating the news feed with information about less important members of the user's network.

Site 106 or another entity may also make suggestions based on the calculated edge strengths. These suggestions may include suggestions of other users of site 106 to include within a network, suggestions for gifts to purchase for other users, or any other type of suggestion. In the former instances, site 106 may suggest to user 102 that user 102 add certain other users of site 106 to the network of user 102. Similarly, site 106 may automatically add certain users to the network of user 102 based on the determined edge strengths.

Site 106 or another entity may also suggest to user 102 certain gifts to give other users of site 106. For instance, site 106 or the other entity may suggest that user 102 purchase a very expensive Christmas gift for a user having a highest edge strength of the network of user 102. Conversely, site 106 or the other entity may suggest that user 102 purchase a much less expensive Christmas gift (or no gift at all) to a user having a much lower edge strength. Similarly, site 106 may suggest Christmas gifts for the top ten users of the network, Fourth of July gifts for the top five users, and Saint Patrick's Day gifts for the top three users. Of course, site 106 or another entity may leverage edges strengths in many other ways in suggesting gifts or providing other suggestions to user 102.

Site 106 or another entity may also employ the calculated edge strengths to determine an audience for advertisements. For instance, if user 102 were to purchase a particular product, the maker of the particular product may reason that those people who are closest to user 102 are the most likely to purchase the same product. Therefore, rather than sending an advertisement for the product to each member of the network of user 102, the maker of the product may choose to target the advertisement to a smaller group. For instance, the maker of the product may choose to send the advertisements to those users who are in the network of user 102 and whose corresponding edge strengths comprise the ten highest strengths or whose strengths are greater than a certain threshold.

In still other embodiments, site 106 or another entity may employ the edge strengths to manage scheduling conflicts. For instance, imagine that user 102 receives an invitation to attend a party hosted by a first user and an invitation to attend a party, hosted by a second user, that is set for the same time. Imagine also that an edge strength of an edge connecting user 102 with the first user is much higher than an edge strength of an edge connecting user 102 with the second user. Here, site 106 or the other entity may reference these edge strengths and, based on the strengths, may automatically accept the first invitation and automatically decline the second conflicting invitation. Similarly, site or the 106 or the other entity may suggest the first invitation rather than automatically accept the invitation.

While a few illustrative examples have been provided, it is to be appreciated that the calculated edge strengths may be leveraged by many different entities in many different ways.

Illustrative Social Graph Edge Strengths

Figure 2:
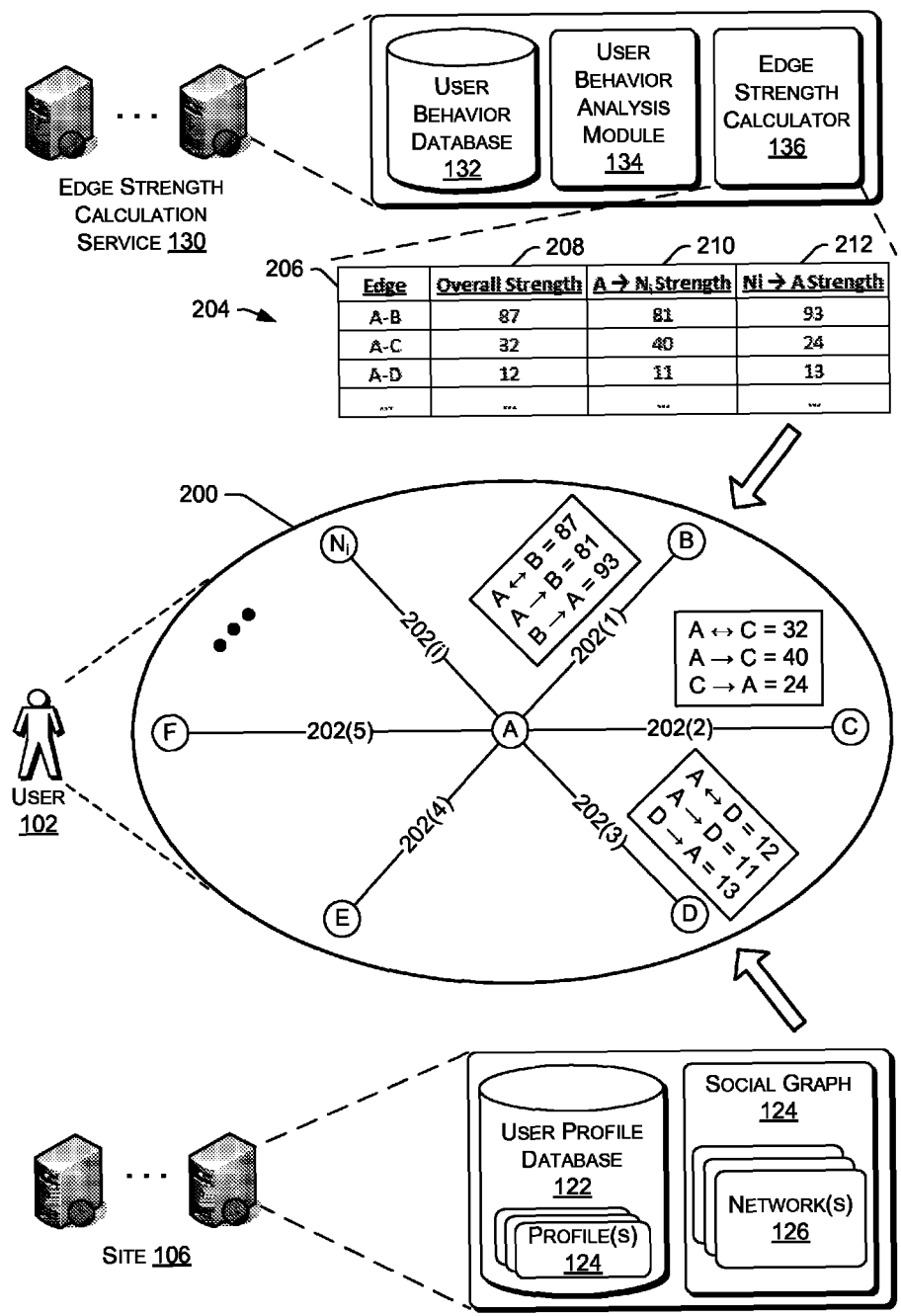
FIG. 2 illustrates an example portion of the social graph from FIG. 1. Here, the example portion represents a network associated with the user from FIG. 1. Each edge of this network is associated with an edge strength that has been calculated by the edge strength calculation service from the example architecture of FIG. 1.

FIG. 2 illustrates an example network 200 associated with user 102. This example network includes nodes associated with users of site 106 who are member of network 200 associated with user 102, who is represented on the social graph and within the network by node "A". Here, network 200 of user 102 includes "i" other users, represented by nodes B, C, D, E, F, . . . , $N_i$, respectively. Each of these other nodes connects to node A (corresponding to user 102) via a corresponding edge 202(1), (2), . . . , (i). That is, according to network 200, user 102 may be considered to have a relationship on social graph 124 with the users represented by nodes B-$N_i$. In a traditional social graph, each of edges 202(1)-(i) may be treated homogeneously, meaning that the traditional social graph would treat the relationship between user 102 and each of the other users as equal.

FIG. 2 further illustrates, however, that edge strength calculation service 130 has calculated edge strengths for each of edges 202(1)-(i) connecting node A to nodes B-$N_i$. FIG. 2 illustrates these calculated edge strengths in the form of a table 204. While table 204 represents these strengths numerically, other implementations may represent edge strengths in any other suitable manner. As illustrated, table 204 includes a column 206 entitled "Edge", a column 208 entitled "Overall Strength" (or "symmetrical strength"), a column 210 entitled "A→$N_i$ Strength", and a column 212 entitled "$N_i$→A Strength".

Column 206 represents which edge the scores of columns 208-212 correspond to. In the current example, the entries within column 206 therefore corresponding to edges A-B, A-C, A-D, . . . , A-$N_i$. Column 208, meanwhile, represents an overall or symmetrical strength of the corresponding edge. That is, this column may indicate a symmetrical affinity between users of the corresponding nodes, as calculated by user behavior analysis module 136. This overall or symmetrical strength may be calculated with reference to the directional strengths (e.g., as an average of the two directional strengths, as a weighted sum of the two directional strengths with differing or equally weights, etc.), or may be calculated independently from the directional strengths.

Next, columns 210 and 212 represent directional edge strengths. That is, these columns may indicate a first user's affinity for a second user and the second user's affinity for the first user, respectively. In the current example, for instance, a first entry in column 210 may indicate an affinity of user 102 for a user associated with node B, while a first entry in column 212 may indicate an affinity of a user associated with node B for user 102.

Here, table 204 illustrates that user 102 and the user associated with node B have an overall edge strength of 87, with user 102 having a somewhat lesser affinity for the node-B user (directional strength of 81) than the node-B user's affinity for user 102 (directional strength of 93). Table 204 also illustrates that user 102 and the user associated with node C have an overall edge strength of 32, with user 102 having a somewhat greater affinity for the node-C user (directional strength of 40) than the node-C user's affinity for user 102 (directional strength of 24). Finally, table 204 illustrates that user 102 and the user associated with node D have an overall edge strength of 12, with user 102 having a slightly lesser affinity for the node-D user (directional strength of 11) than the node-D user's affinity for user 102 (directional strength of 13).

Table 204 thus illustrates that of edges A-B, A-C, and A-D, A-B has a highest edge strength and is therefore the strongest edge. In some instances, this represents that user 102 and the user associated with node B have a stronger affinity with one another than do user 102 and the users associated with nodes C and D. Again, site 106 or another may use this knowledge to better understand the relationships within social graph 124 and may leverage this better understanding in many ways, as discussed above. Additionally, edge strength calculation service 130 may calculate edge strengths for some or all of networks 126 and, therefore, for some or all edges that define social graph 124.

Figure 3:
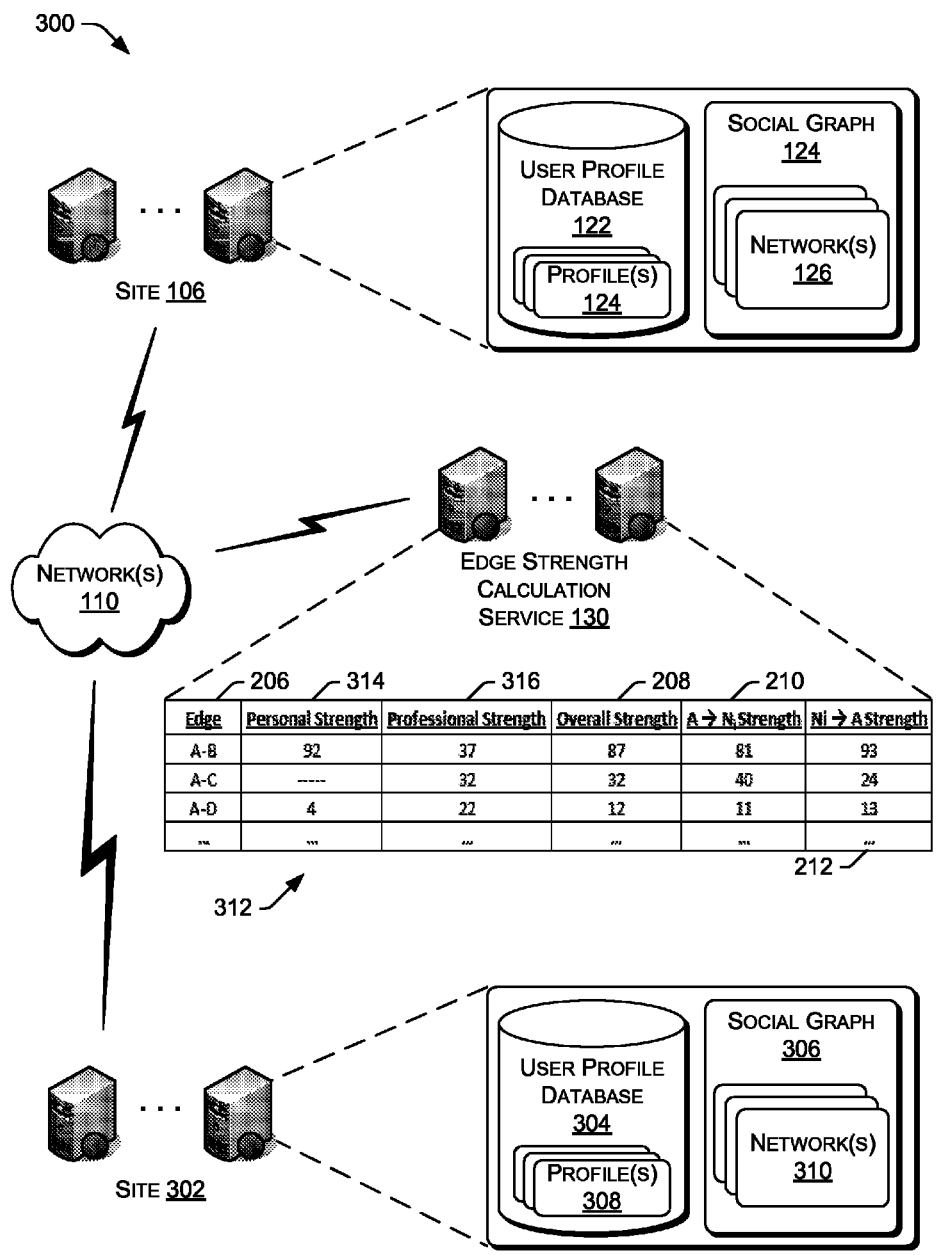

FIG. 3 illustrates another illustrative architecture 300 that includes site 106, edge strength calculation service 130, and an additional site 302. Additional site 302 may comprise similar or different features as site 106. For instance, site 302 may include or have access to a user profile database 304 and may employ a social graph 306. As described above in regards to site 106, user profile database 304 may store or have access to one or more user profiles 308 corresponding to users of site 302. Social graph 306, meanwhile, may comprise one or more networks 310 of the users of site 302.

In some instances, site 302 may be a social networking site of a different type than social networking site 106. For instance, site 106 may here comprise a personal site, while site 302 may here comprise a work-related or professional site. Of course, it is to be appreciated that site 106 and/or site 302 may comprise any other sort of social networking site or other site.

Here, both site 106 and site 302 may provide user activity to edge strength calculation service 130. With this information, edge strength calculation service 130 may calculate different types of edge strengths connecting users on social graphs 124 and 306. In addition to calculating "overall strength" 208 and directional strengths 210 and 212, service 130 may store a table 312 that measures a "personal strength" 314 and a "professional strength" 316. Here, personal strength 314 may represent or be indicative of a personal affinity between users, while professional strength 316 may represent or be indicative of a professional affinity between users. In some instances, service 130 calculates personal strengths with reference to personal site 106, while calculating professional strengths with reference to site 302. It is noted, however, that other implementations may additionally or alternatively calculate these differing edge strengths with reference to differing types of activities on sites 106 and 302, as discussed above.

To illustrate, table 312 again represents different edge connections 206 within social graphs 124 and 306. Here, however, service 130 has calculated a personal strength and/or a professional strength between the user associated with node A (user 102) and the users associated with nodes B-N$_i$. For instance, table 312 represents that user 102 and the user associated with node B have a personal edge strength of 92, while a professional strength of only 37. This may indicate that user 102 and the user associated with node B have a stronger personal relationship than they do a working relationship.

Conversely, table 312 represents that user 102 may not have a personal relationship (or a relatively small one) with the user associated with node C, while these users do have a working or professional relationship. In some instances, because user 102 and the user associated with node C do not have a personal edge strength, these two users may not have an edge connection on social graph 124 of personal social networking site 106. However, because these users do have a professional edge strength, these users may be connected on social graph 306 on professional social networking site 302. Finally, user 102 and the user associated with node D are illustrated as having a greater professional edge strength (22) than personal strength (4).

In implementations that calculate different dimensions of edge strengths (e.g., personal, professional, etc.), overall strength 208 as well as directional strengths 208 and 210 may be based in whole or in part on dimensional strengths 314 and 316. In other implementations, overall strength 208 and directional strengths 210 and 212 may be calculated independently of the dimensional strengths.

Operation

Figure 4:
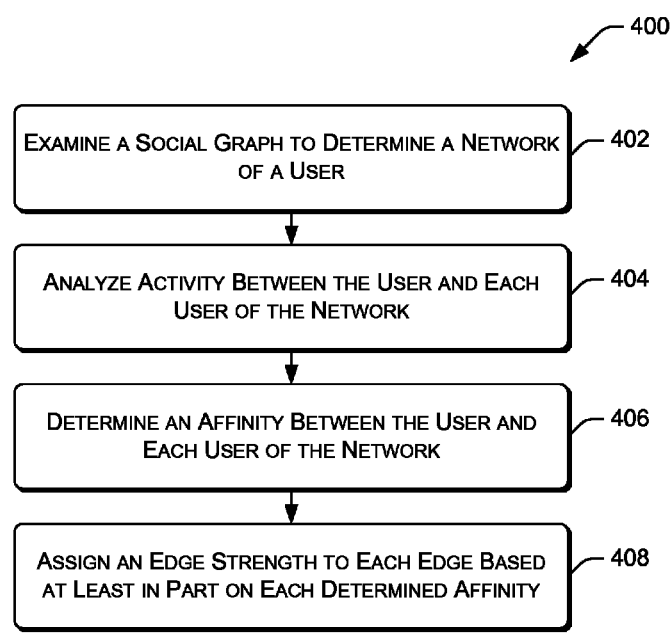
FIGS. 4-6 are flow diagrams of example processes for calculating edge strengths for edges in a social graph.
Figure 5:
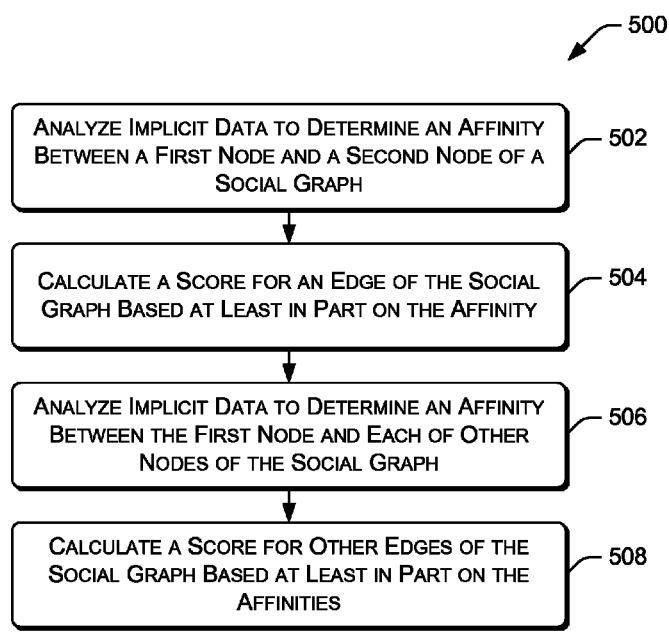
Figure 6:
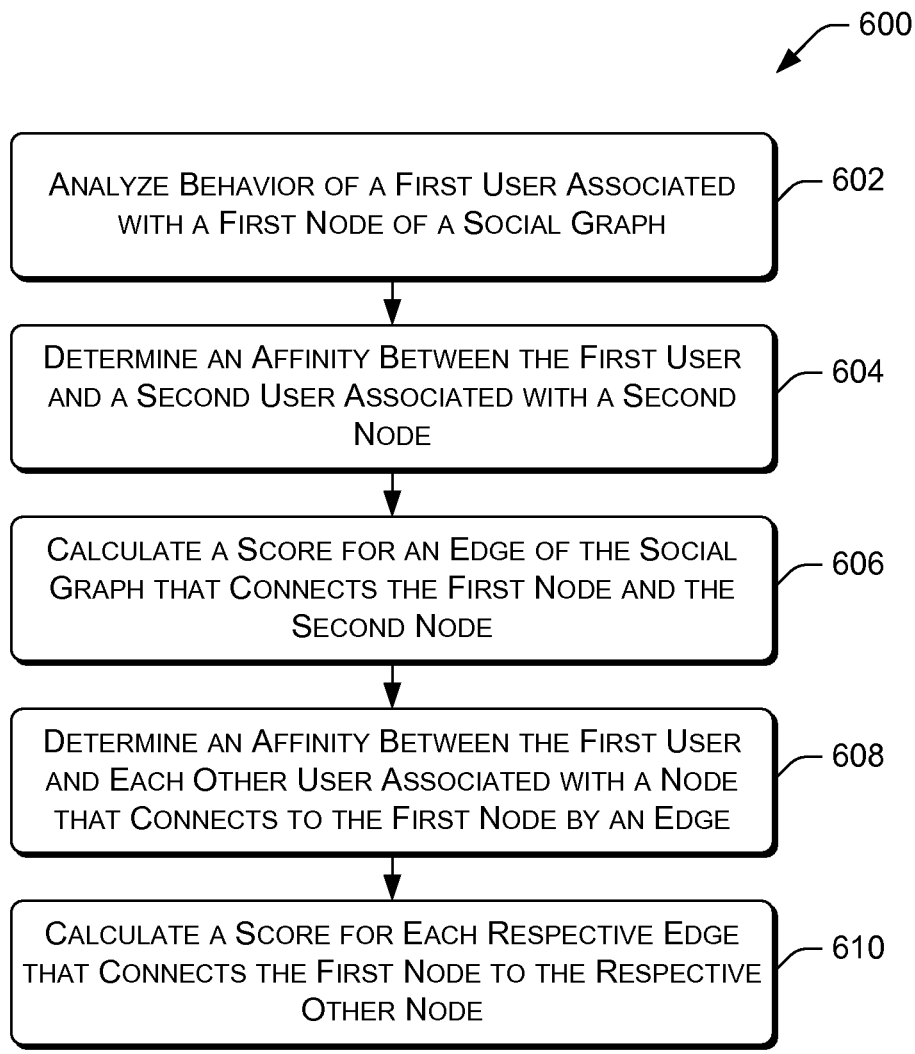

FIGS. 4-6 illustrate example processes 400, 500, and 600 for calculating strengths of edges in a social graph as discussed above. These processes are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the architecture 100 of FIG. 1. In particular, many acts described below may be implemented and performed by edge strength calculation service 130 and/or service provider 108 in tandem with site 106.

FIG. 4 illustrates process 400, which includes examining, at operation 402, a social graph to determine a network of a user. This network may comprise, for instance, network 200 of user 102 illustrated in FIG. 2. Next, at operation 404, the activity between the user and each user in the network is analyzed. As described above, this activity may include sending messages between the users, buying gifts for or receiving gifts from the user, or any other type of activity. Operation 406 then determines an affinity at least in part based upon the analyzed activity. This affinity may represent a symmetrical affinity, a directional affinity, or both. Finally, operation 408 assigns an edge strength to each edge of the network based at least in part on the determined affinity. As such, the assigned edge strengths are indicative of an affinity between the user and each of the users within the network.

FIG. 5 illustrates process 500, which includes analyzing, at operation 502, implicit data to determine an affinity between a first node and a second node of a social graph. Here, the implicit data may include user behavior, user activity, or any other sort of implicit data. Additionally, the first and second nodes may be associated with users of a site (e.g., a social networking site), organizations, or any other types of entities. Next, operation 504 calculates a score for an edge of the social graph based at least in part on the determined affinity. In some instances, this edge comprises the edge connecting the first and second nodes in the social graph.

Process 500 further includes operation 506, at which point the implicit data is analyzed to determine an affinity between the first node and each of the multiple other nodes of the social graph. Finally, operation 508 calculates a score for the other edges of the social graph based at least in part on the determined affinities.

FIG. 6 illustrates process 600, and may begin with operation 602. Here, behavior of a first user associated with a first node of a social graph is analyzed. Operation 604 then determines an affinity between the first user and a second user associated with a second node of the social graph, based at least in part on the determined affinity. Next, operation 606 calculates a score for an edge of the social graph connecting the first node and the second node. This may be based in part or in whole on the determined affinity. Operation 608 then determines an affinity between the first user and each other user associated with a node that connects to the first node by an edge of the social graph. Finally, operation 610 calculates a score to each respective edge that connects the first node to the respective other node.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
examining, by one or more processors, a social graph to determine, for a first user represented by a first node of the social graph, a group of users represented by respective other nodes that connect to the first node by respective edges of the social graph;
analyzing, by the one or more processors, activity between the first user and each user of the group of users;
determining, by the one or more processors, an affinity between the first user and each user of the group of users based at least in part on the analyzed activity;
assigning, by the one or more processors, an edge strength indicative of the determined affinity to each of the respective edges of the social graph; and
determining, by the one or more processors, a value of a gift for a second user of the group of users, the value of the gift based at least in part on the edge strength between the first user and the second user of the group of users.

2. A method as recited in claim 1, wherein the analyzing of the activity further comprises analyzing communications between the first user and each user of the group of users on a social networking site that employs the social graph.

3. A method as recited in claim 1, wherein each of the assigned edge strengths represents a directional strength from the first user to another user, a directional strength from another user to the first user, or a symmetrical strength between the first user and another user.

4. A method as recited in claim 1, wherein the analyzing of the activity between the first user and each user of the group of users further comprises analyzing behavior of the first user on a social networking site represented by the social graph and behavior of a first member that is not associated with the social networking site represented by the social graph, the behavior not associated with the social networking site further including telephonic behavior.

5. A method as recited in claim 1, wherein the selecting, by one or more processors, the value of the gift for the second user of the group of users further comprises selecting a relative value for the gift for the second user based at least in part on the affinity between the first user and the second user relative to an affinity between the first user and a third user of the group of users.

6. A method as recited in claim 1, further comprising selecting a value range for the gift for the second user, and a lower value range for a gift for a third user due to a lower edge strength.

7. One or more non-transitory computer-readable media storing computer-executable instructions that, when executed on one or more processors, perform acts comprising:
determining an affinity between a first user and a second user based at least in part on behavior of at least one of the first user or the second user;
calculating a strength of an edge of a social graph based at least in part on the determined affinity, the edge connecting the first user and the second user on the social graph and the social graph having at least one calculated edge strength that is different than another calculated edge strength; and
a value for a gift for the second user, the value of the gift based at least in part on the calculated edge strength between the first user and the second user.

8. One or more non-transitory computer-readable media as recited in claim 7, wherein the behavior of the at least one of the first user or the second user comprises activity of the at least one of the first user or the second user on a social networking site associated with the social graph.

9. One or more non-transitory computer-readable media as recited in claim 8, wherein the behavior of the first user and/or the second user further comprises activity of the first user and/or the second user that is not associated with the social networking site associated with the social graph, the behavior not associated with the social networking site further including at least one of:
reading behavior,
telephonic behavior, or
travel behavior.

10. One or more non-transitory computer-readable media as recited in claim 7, wherein the strength of the edge of the social graph represents directional strength of a relationship between the first user and the second user.

11. One or more non-transitory computer-readable media as recited in claim 7, wherein the strength of the edge of the social graph represents a symmetrical strength of a relationship between the first user and the second user.

12. One or more computing devices comprising:
one or more processors; and
the one or more non-transitory computer-readable media storing the computer-executable instructions as recited in claim 7.

13. A method comprising:
analyzing, by one or more processors, implicit data to determine an affinity between a first node and a second node on a social graph, wherein the first node is associated with a first person and the second node is associated with a second person;
calculating, by the one or more processors, a score for an edge of the social graph based at least in part on the determined affinity;
wherein on a site that employs the social graph, the first node is associated with a first user of the site corresponding to the first person, and the second node is associated with a second user of the site corresponding to the second person, and wherein the analyzed implicit data comprises activity of the first person, the second person, or both the first person and the second person that is not associated with the site; and
determining, by the one or more processors, a value of a gift for the second person, the value of the gift based at least in part on the score for the edge of the social graph between the first node and second node.

14. A method as recited in claim 13, wherein the implicit data comprises communications between the first person and the second person, attending events with the first person or the second person, or a location of the first person or the second person.

15. A method as recited in claim 13, wherein the first node connects to the second node and each of multiple other nodes on the social graph, and further comprising:
analyzing the implicit data to determine an affinity between the first node and each of the multiple other nodes on the social graph; and
calculating a score for each edge connecting the first node and each of the multiple other nodes on the social graph based at least in part on the determined affinities.

16. A method as recited in claim 13, further comprising calculating a respective score for substantially all of the edges of the social graph based at least in part on respective determined affinities.

17. One or more non-transitory computer-readable media storing computer-executable instructions that, when executed on one or more processors, performs acts comprising:
analyzing behavior of a first user associated with a first node of a social graph, the behavior including:
behavior of the first user on a social networking site represented by the social graph, and behavior of the first user that is not associated with the social networking site represented by the social graph;
determining an affinity between the first user and a second user associated with a second node of the social graph based at least in part on the analyzed behavior;
determining an affinity between the first user and a third user associated with a third node of the social graph based at least in part on the analyzed behavior;
computing a score for an edge of the social graph that connects the first node and the second node based at least in part on the determined affinity;
computing a score for an edge of the social graph that connects the first node and the third node based at least in part on the determined affinity; and
determining, by the one or more processors, a value of a gift for the second user based at least in part on the score for the edge of the social graph that connects the first node and the second node and a value of a gift for a third user based at least in part on the score for the edge of the social graph that connects the first node and the third node, wherein the value of the gift for the second user is determined to be higher than the value of the gift for the third user based at least in part on the score for the edge of the social graph that connects the first node and the second node being higher than the score for the edge of the social graph that connects the first node and the third node.

18. One or more non-transitory computer-readable media as recited in claim 17, wherein the behavior of the first user further comprises sending a message to or receiving a message from the second user, attending an event with the second user, or joining a group that includes the second user.

19. One or more non-transitory computer-readable media as recited in claim 17, wherein the analyzing of the behavior comprises analyzing multiple types of activity by the first user, and wherein the determining of the affinity comprises weighting each of the multiple types of activity.

20. One or more non-transitory computer-readable media as recited in claim 17, wherein the determining of the affinity comprises determining an affinity of the first user for the second user or determining an affinity of the second user for the first user, and wherein the computing of the score comprises computing a score that represents the affinity of the first user for the second user or computing a score that represents the affinity of the second user for the first user.

21. One or more non-transitory computer-readable media as recited in claim 17, further storing computer-executable instructions that, when executed on the one or more processors, perform acts comprising:
determining an affinity between the first user associated with the first node and each other user associated with a node that connects to the first node by a respective edge; and
computing a score for each respective edge that connects the first node to the respective other node based at least in part on the respective determined affinity.

22. One or more computing devices comprising:
one or more processors; and
the one or more non-transitory computer-readable media storing the computer-executable instructions as recited in claim 17.

23. One or more non-transitory computer-readable media as recited in claim 17, the behavior not associated with the social networking site including at least one of:
reading behavior, or
travel behavior.

24. One or more non-transitory computer-readable media storing computer-executable instructions as recited in claim 17 that, when executed on one or more processors, perform acts further comprising:
accepting, on behalf of the first user, the invitation from the second user; and
declining, on behalf of the first user, the invitation from the third user.

25. A system comprising:
one or more processors;
memory, accessible by the one or more processors;
a user behavior analysis module stored in the memory and executable on the one or more processors to analyze behavior of a first member in a social graph of a social networking site to determine an affinity between the first member and a second member in the social graph, wherein the user behavior analysis module is configured to analyze behavior of the first member on the social networking site and behavior of the first member that is not associated with the social networking site;

an edge strength calculator stored in the memory and executable on the one or more processors to calculate an edge strength based at least in part on the determined affinity, the edge strength corresponding to an edge in the social graph connecting the first member and the second member; and social networking site to suggest a value of a gift for the second member, the value of the gift based at least in part on the edge strength of the edge that connects the first member and the second member.

26. A system as recited in claim 25, wherein the user behavior analysis module is configured to periodically analyze behavior of the first member to determine the affinity between the first member and the second member, and wherein the edge score calculator is configured to periodically calculate the edge strength corresponding to the edge in the social graph connecting the first member and the second member.

27. A system as recited in claim 25, wherein the edge strength calculated by the edge strength calculator decays with time.

28. A system as recited in claim 25, wherein the edge strength calculator is configured to calculate a first dimension edge strength and a second dimension edge strength for the edge in the social graph connecting the first member and the second member, the first dimension strength representing a strength of a first dimension of a relationship between the first member and the second member and the second dimension edge strength representing a strength of a second dimension of the relationship between the first member and the second member.

29. A system as recited in claim 28, wherein the first dimension edge strength is a personal edge strength representing a strength of a personal relationship between the first member and the second member and the second dimension edge strength is a professional edge strength representing a strength of a professional relationship between the first member and the second member.

30. A system as recited in claim 25, wherein the user behavior analysis module is configured to analyze behavior of the first member at least in part to determine the affinity between the first member and the second member in the social graph, and the behavior analyzed comprises the first member being marked as appearing in a photograph with the second member.

31. A system as recited in claim 25, wherein the behavior of the first member that is not associated with the social networking site occurs on a telephone.

* * * * *